United States Patent Office 2,755,892
Patented July 24, 1956

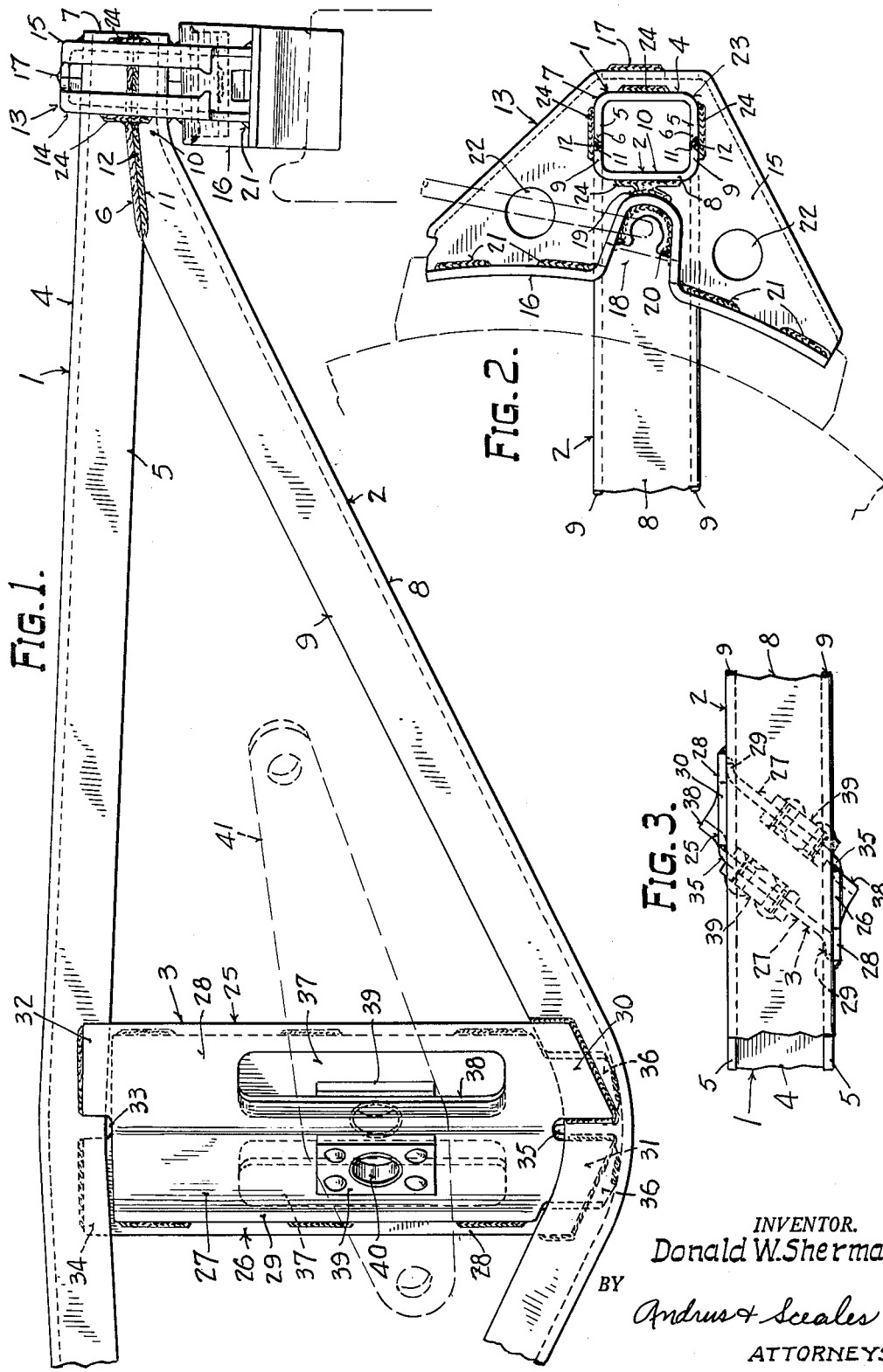

2,755,892

RAILWAY CAR BRAKE BEAM ASSEMBLY

Donald W. Sherman, Milwaukee, Wis., assignor to A. O. Smith Corporation, Milwaukee, Wis., a corporation of New York Application April 21, 1952, Serial No. 283,326

7 Claims. (Cl. 188—223.1)

This invention relates generally to a railway brake beam assembly and particularly to a unitary type of brake beam upon which is mounted brake shoes adapted to be moved into and out of engagement with the wheels of a railway car.

It has been the general practice to fabricate a brake beam assembly from separate structural parts comprising compression and tension members joined and spaced by a strut, and brake heads disposed at the opposite ends of the compression and tension members and then joining the parts together, for instance, as by welding, riveting, and in some cases removably securing the brake heads to the threaded ends of the tension member.

A practice that has also been followed provides for notching the edge portion of a brake shoe plate to receive the end of the compression and tension member where a weld is provided to join the members together. Quite generally the compression member is of channel formation and the ends of the tension member are upset to a form that adapt the latter to be disposed between the flanges and to bear against the web of a channeled compression member where the individual parts are welded together.

The principal object of this invention is to provide a brake beam for a railway car or the like in which the ends of the channel section compression and tension members are joined by butt welding the opposing flanges together to form box section end portions on the beam.

A further object is to provide a brake beam that is lighter in weight and in which greater rigidity is provided at the end of the beam.

Another object is to provide a welded brake beam in which the welds joining the opposed flanges of the channel section compression and tension members are located on a line substantially midway between the webs of the members and generally perpendicular to the load imposed on the beam in service.

A still further object is to provide a brake beam in which the compression and tension members are preformed prior to joining the members together to thereby prevent preloading of the members which might cause the metal of the members to stretch to a degree where a permanent set of the metal might occur which would obviously damage the beam.

Another object is to provide a brake beam in which the compression and tension members are cold formed into channel section from strip stock to provide light weight beam members having strength.

In general the invention is directed to a truss-type brake beam and brake assembly wherein the brake beam is formed of stamped sheet metal generally channel-shaped compression and tension members preformed to final shape with the ends of these members welded together for a substantial distance along the beam to form a box-like structure at the end portions and which is in turn welded to the side plates of a brake head at the respective ends of the beam. The beam is braced intermediately by a built-up strut which houses means for loading the beam in service.

Other objects of the invention will appear from the following description when taken in conjunction with the drawing in which:

Figure 1 is a fragmentary top plan view of the brake beam of the invention together with a brake head disposed at one end of the beam;

Fig. 2 is an end view of the brake beam with parts being broken away; and

Fig. 3 is a fragmentary end view of the mid-portion of the beam showing a strut disposed between and secured to the compression and tension members.

According to the invention the brake beam comprises a compression member 1, a tension member 2 and a strut 3 disposed between the compression and tension members.

The compression member 1 is preferably formed cold from flat strip stock to channel shape providing a web 4 and flanges 5. In forming the compression member in this manner, the metal of the strip stock is so distributed as to provide a structural shape of light weight and of great strength.

The compression member is scarfed at 6 for a substantial distance inwardly from the outer ends 7 of the member to receive weld material to join the tension member thereto in a unitary structure. It will be noted from Figure 1 that a substantial portion of the welds joining the end portions of members 1 and 2 is disposed substantially on the neutral bending axis of stress of the resultant box-section end portions of the beam and is therefore subjected to a minimum of the attendant stresses or strains which might occur on the brake head when applied to the wheel.

The tension member 2 is also formed, as described above with respect to the compression member, to channel shape providing a web 8 and side flanges 9. The over-all general configuration of the tension member is of V-shape with the greatest depth of the V being disposed opposite the center of the compression member.

Ends 10 of the tension member are formed so that they will be disposed substantially parallel with the outer ends of the compression member. The outer ends of the flanges 9 are reduced in depth and are scarfed at 11 to complement the scarfs 6 of the compression member 1. As best seen in Fig. 2, when the compression and tension member are joined at scarfs 6 and 11 respectively by welds 12, there is formed at the ends of the members a butt welded box section of great strength and rigidity. While members 1 and 2 are described as being scarfed at 6 and 11, respectively, for joining by arc butt welds, other forms of butt welding may be utilized which may require somewhat different preparation for welding. In the case of flash butt welding the flanges of members 1 and 2 are initially provided with greater depth at 6 and 11, respectively, to provide burn-off metal to be consumed while heating the edges to be joined.

It is of particular importance in the fabrication of a brake beam assembly to keep the weight of the same as light as possible, commensurate of course, with the maintenance of maximum strength and rigidity. The assembly just described provides this construction in that the box section obviates the necessity of using overlapping ends such as is found when one channel is disposed within the other, or when the ends of either the compression or tension member is upset to form a substantially solid end which is to be joined to the other member of the beam.

Brake heads 13 are secured to the opposite ends of the brake beam, only one of such heads being shown. Each head 13 is of generally hollow construction, and comprises a substantially triangular shaped inner side plate 14 and a similarly shaped outer side plate 15 and a generally arcuate shaped wear plate 16 against which a brake shoe, shown in dash lines in Fig. 2, is adapted to bear. The side plates are provided with inwardly disposed flanges at the outer end which abut one another and are secured together as by a weld 17.

The side plates are each provided with a socket 18 extending inwardly from the arcuate wear plate 16 to receive a hanger, shown in dash lines. The wear plate 16, as best seen in Fig. 2, follows the contour of the socket and has its edges at the inner end of the socket secured to the side plates by welds 19. A hardened bushing 20 of similar shape to the base portion of the socket, is secured in any suitable manner to the socket and is adapted to resist wear of the hanger with which it comes into contact. The wear plate 16 may be secured to the outer surfaces of the respective side plates in any suitable manner but it is preferable that the various members be joined as by welds 21.

The side plates are provided with openings 22 which further lighten the weight of the brake head.

Closely adjacent socket 18, and disposed between the socket and the outer edges of side plates 14 and 15, are generally rectangular shaped openings 23, which are aligned and disposed to receive the outer opposite ends of the brake beam. The openings 23 are just slightly larger than the box shaped end of the beam so that when the latter is disposed therein a substantially snug fit between the ends of the beam and the brake head is assured. The brake beam is welded to the outer surface of the side plates of the brake head as by welds 24. This construction provides an exceedingly rigid structure which is unhampered by the undesirable structural features most generally found in this field.

The strut member 3 is disposed between and secured to the compression and tension members at substantially the middle point of the members, as best seen in Figure 1. The strut is an elongated generally hollow rectangular built-up member comprised of an upper plate 25 and a lower plate 26. Each plate if of substantially Z-shape, as best seen in Fig. 3 with each plate having a web 27 and parallel flanges 28 and 29, the former flange being of substantial width while its companion flange 29 is quite narrow. The web 27 is disposed angularly between the two flanges.

The near ends 30 and 31 respectively of flanges 28 of both the upper and lower plate are cut angularly to permit the same to follow generally the angularity to which the tension member is formed. The far end 32 of flange 28 of upper plate 25 is disposed horizontally over the upper flange 5 of the compression member 1 and welded thereto. The web 27 and lower flange 29 below flange 28 of plate 25 are cut away at 33 to clear the upper and lower flanges 5 of compression member 1. The far end 34 of flange 28 of lower plate 26 is disposed horizontally under the lower flange 5 of the compression member and is welded to flange 5. As with the upper plate 25 the web 27 and flange 29 are cut away to clear the upper and lower flanges of the compression member.

As above stated, the upper strut plate 25 comprises essentially, a flange 28 of substantial width, a narrow flange 29 and a web 27 angularly disposed between the two flanges.

The lower strut plate is a duplicate of the upper plate and is disposed in reverse relationship to the upper strut plate. Flange 28 of the upper strut plate overlies the outer surface of flange 9 of tension member 2 and the upper flange 5 of the compression member 1 and is welded to these flanges. Flanges 29 of each strut plate are disposed intermediate the compression and tension members and in the plane of the lower flange of each member and are welded to the inner faces of the flanges 28 of the opposite strut plate. The upper strut plate is notched at 35 at one end of the plate to straddle the upper flange 9 of the tension member. The lower plate is similarly notched to straddle the lower flange of the tension member.

As best seen in Figure 1 the near ends of webs 27 of the upper and lower plates are formed with tongues 36 which seat against the web of the tension member and to which they are welded. This construction of strut 3 provides a substantially strong structure in that the two plates are so formed as to result in a box-like structure as compared to the open type strut generally in use and which does not possess the rigidity of the strut of this invention.

Both plates are provided with elongated opening 37 disposed longitudinally of the long flanges of the plates to provide a strut which is light in weight. One longitudinal edge 38 of each opening is turned upwardly from the plate to provide extra strength to the plates. Bearing plates 39 are disposed substantially centrally of the web members of each plate and each are provided with a bushing 40 to receive a lever 41, shown by dash lines, for operating the brake beam.

Of particular importance in the brake team of this invention is the fact that the compression and tension members are preformed to final shape including angularity prior to assembling the component parts together. In other words the desired camber of the compression member, the desired angle between the legs of the tension member and the bends at the ends of the tension member, are all preformed into the respective members so that the members are not forced together during assembly and the resultant beam is not preloaded with forming stresses. By following the practice of this invention the assembled structure is free to take the stresses incumbent with its use without being subjected to the additional stresses which might be formed in the structure and which would be occasioned were the strut placed in position and the ends of the compression and tension members forced together and then secured as is the common practice.

Various embodiments of the invention may be employed within the scope of the following claims.

I claim:

1. A brake beam assembly for a railway car or the like having a unitary beam structure and being substantially free of forming stresses comprising a channel-shaped compression member, a tension member of substantially channel shape, said members each being preformed with a predetermined degree of cambre therein, said tension member having its end portions angularly formed with respect to the balance of said member, the end portions of the compression and tension members being disposed to permit the channels of said members to abut to provide a substantially box-shape at the ends thereof, a weld disposed between the abutting end portions of the compression and tension members and extending inwardly from the ends of said members for a substantial distance to provide rigidity at the ends of the beam structure, a built-up brake head disposed at opposite ends of the compression and tension members and comprising a pair of side plates having inturned abutting flanges disposed along the outer edges of the plates and a shoe plate disposed along the inner edges of said plates, said plates being joined together by welds and said inturned flanges being joined together by a weld disposed therebetween, aligned box-shaped apertures disposed in the side plates and adapted to receive the end section of the beam structure, welds disposed between the outer surfaces of the side plates and the box-shaped ends of the beam structure, and a built-up strut comprising a pair of elongated Z-shaped plates disposed between the compression and tension members and having the ends of said plates cut away and angularly formed and being disposed to straddle the flanges of the compression and tension members, said plates being secured together by welds to form a substantially hollow elongated box-like structure secured at its ends to the inner and outer surfaces of the channels of the compression and tension members.

2. A brake beam assembly for a railway car or the like having a unitary beam structure and being substantially free of forming stresses comprising a channel-shaped compression member, a tension member of substantially channel shape, said members each being preformed with a predetermined degree of cambre therein, said tension member having its end portions angularly formed with respect to the balance of said member, the end portions of the compression and tension members being disposed to permit the channels of said members to abut to provide a substantially box-shape at the ends thereof, a weld disposed between the abutting end portions of the compression and tension members and extending inwardly from the ends of said members for a substantial distance to provide rigidity at the ends of the beam structure, a built-up brake head disposed at opposite ends of the compression and tension members and comprising a pair of side plates having inturned abutting flanges disposed along the outer edges of the plates and a shoe plate disposed along the inner edges of said plates, said plates being joined together by welds and said inturned flanges being joined together by a weld disposed therebetween, aligned box-shaped apertures disposed in the side plates and adapted to receive the end section of the beam structure, welds disposed between the outer surfaces of the side plates and the box-shaped ends of the beam structure, and a built-up strut comprising a pair of elongated Z-shaped plates disposed between the compression and tension members and having the ends of said plates cut away and angularly formed and being disposed to straddle the flanges of the compression and tension members, said plates being secured together by welds to form a substantially hollow elongated box-like structure and being secured at its ends to the inner and outer surfaces of the channels of the compression and tension members, and having a bearing plate disposed substantially centrally of each elongated Z-shaped plate and secured thereto and being each provided with a bushing to receive mechanism to operate the truss-type brake beam.

3. A brake beam assembly for a railway car or the like having a unitary beam structure and being substantially free of forming stresses comprising a channel-shaped compression member, a tension member of substantially channel shape, said members each being preformed with a predetermined degree of cambre therein, said tension member having its end portions angularly formed with respect to the balance of said member, the end portions of the compression and tension members being disposed to permit the channels of said members to abut to provide a substantially box shape at the ends thereof, a weld disposed between the abutting end portions of the compression and tension members and extending inwardly from the ends of said members for a substantial distance to provide rigidity at the ends of the beam structure, a built-up brake head disposed at opposite ends of the compression and tension members and comprising a pair of side plates having inturned abutting flanges disposed along the outer edges of the plates and a shoe plate disposed along the inner edges of said plates, said plates being joined together by welds and said inturned flanges being joined together by a weld disposed therebetween, aligned box-shaped apertures disposed in the side plates and adapted to receive the end section of the beam structure, welds disposed between the outer surfaces of the side plates and the box-shaped ends of the beam structure, and a built-up strut comprising a pair of elongated plates having angularly disposed flanges formed longitudinally of the side edges of said plates, the ends of said plates being cut away and angularly formed with respect to one another to permit the flanges to overlie the flanges of the compression and tension members, a longitudinal aperture disposed in each said elongated plate and having upturned flanges disposed along one edge of each said aperture, and a bearing plate disposed substantially centrally of each elongated plate and being secured thereto with each plate being provided with a bushing member to receive mechanism to operate the truss-type brake beam.

4. In a brake beam assembly for a railway car or the like comprising a compression member of channel section, a tension member of channel section spaced from the compression member with the flanges of said members facing each other, the end portions of the tension member being formed angularly to the balance of said tension member with the flanges of the members being disposed in abutting relation at each end of said members to form box-shaped end portions on the beam assembly, welds joining the abutting flanges of the channel section members and being located on a line substantially midway between the webs of the members and generally perpendicular to the load imposed on the beam in service, a brake head provided with a box-shaped aperture therethrough corresponding to the box-shaped end portions on the beam assembly and disposed over each box-shaped beam ends, and welds securing the brake heads to the members.

5. A brake beam assembly for a railway car or the like comprising a compression member of channel section, a tension member of channel section spaced from the compression member with the flanges of said members facing each other, the end portions of the tension member being formed angularly to the balance of said tension member with the flanges of the members being disposed in abutting relation at each end of said members to form box-shaped end portions on the beam assembly, welds joining the abutting flanges of the channel section members and being located on a line substantially midway between the webs of the members and generally perpendicular to the load imposed on the beam in service, a brake head provided with a box-shaped aperture therethrough corresponding to the box-shaped end portions on the beam assembly and disposed over each box-shaped beam end, welds securing the brake heads to the members, a built-up strut comprising a pair of elongated Z-shaped plates disposed between the spaced members centrally of the beam assembly with the ends of said plates cut away and angularly formed and being disposed to straddle the flanges of said members, and welds securing the strut plates together and to the flanges of said members.

6. In a brake beam assembly for a railway car, a compression members of channel section, a tension member of channel section spaced from the compression member with the flanges of said members facing each other, the end portions of the tension member being formed angularly to the balance of said tension member with the flanges at the end portions of the respective members being disposed in abutting relation, and welds joining the abutting flanges of the channel section members and being located substantially on a line perpendicular to the load imposed on the beam in service and forming box-section end portions adapted to support a brake head.

7. In a brake beam assembly for a railway car, a compression member of channel section, a tension member of channel section spaced from the compression member with the flanges of said members facing each other, the end portions of the tension member being formed angularly to the balance of said tension member with the flanges at the end portions of the respective members being disposed in abutting relation, welds joining the abutting flanges of the channel section members and being located on a line substantially midway between the webs of the channel members and generally perpendicular to the load imposed on the beam in service and forming box-section end portions adapted to support a brake head, and a strut disposed between the spaced members centrally of the beam to brace the beam and provide means for loading the beam in service.

References Cited in the file of this patent

UNITED STATES PATENTS

| | | |
|---|---|---|
| 461,776 | Alley | Oct. 20, 1891 |
| 464,781 | Schoen | Dec. 8, 1891 |
| 1,303,435 | Whitney | May 13, 1919 |
| 1,426,705 | Bauer | Aug. 22, 1922 |
| 1,565,346 | Whitney | Dec. 15, 1925 |
| 2,427,893 | Baselt | Sept. 23, 1947 |
| 2,480,953 | Osner | Sept. 6, 1949 |
| 2,493,913 | Busch | Jan. 10, 1950 |
| 2,500,232 | Baselt et al. | Mar. 14, 1950 |
| 2,665,779 | Smith et al. | Jan. 12, 1954 |

FOREIGN PATENTS

| | | |
|---|---|---|
| 736,239 | France | Sept. 13, 1932 |
| 883,619 | France | Mar. 29, 1943 |